Figure 1:
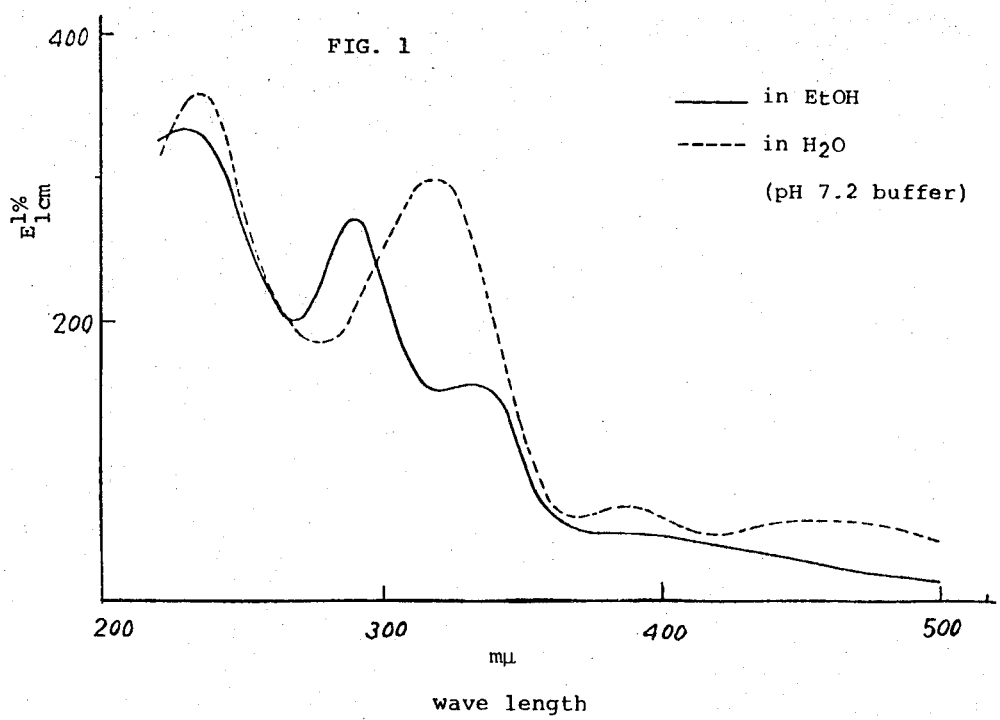

United States Patent [11] 3,627,881

| | | |
|---|---|---|
| [72] | Inventors | Motoo Shibata<br>Toyonaka;<br>Toru Hasegawa, Osaka; Eiji Higashide, Takarazuka; Toyokazu Kishi, Nara; Hideo Yamana, Osaka; Setsuo Harada; Masayuki Muroi, both of Suita; Mitsuko Asai, Takatsuki; Komei Mizuno, Settsu, all of Japan |
| [21] | Appl. No. | 708,319 |
| [22] | Filed | Feb. 26, 1968 |
| [45] | Patented | Dec. 14, 1971 |
| [73] | Assignee | Takeda Chemical Industries, Ltd.<br>Osaka, Japan |
| [32] | Priorities | Feb. 25, 1967 |
| [33] | | Japan |
| [31] | | 42/11976;<br>Sept. 9, 1967, Japan, No. 42/57777 |

[54] METHOD FOR PRODUCING ANTIBIOTIC B-2847
3 Claims, 5 Drawing Figs.

[52] U.S. Cl. .................................................. 424/121,
424/122, 195/80

[51] Int. Cl. ............................................. A61k 21/00
[50] Field of Search ........................................ 424/121,
122; 195/80

[56] References Cited
UNITED STATES PATENTS
3,534,138  10/1970  Ishida et al. .................  424/121

*Primary Examiner*—Jerome D. Goldberg
*Attorney*—Wenderoth, Lind & Ponack

ABSTRACT: Antibiotically active compounds which have strong antimicrobial activity against some common bacteria and acid-fast bacteria, and are useful inter alia in the treatment of *Staphylococcus aureus* topical infections, are obtained by culturing *Streptomyces tolypophorus* and mutants and variants thereof in a nutrient medium containing assimilable carbon sources and digestible nitrogen sources.

MOTOO SHIBATA,
TORU HASEGAWA,
EIJI HIGASHIDE,
TOYOKAZU KISHI,
HIDEO YAMANA,
SETSUO HARADA,
MASAYUKI MUROI,
MITSUKO ASAI AND
KOMEI MIZUNO,
INVENTORS

METHOD FOR PRODUCING ANTIBIOTIC B-2847

This invention relates to antibiotically active novel compounds and to the production thereof. More particularly, this invention relates to a group of antibiotics B-2847Y and B-2847R (hereinafter these have been collectively named and referred to as B-2847).

The invention is based on the following findings:
1. that some micro-organisms capable of producing the new antibiotics are isolated from soil samples;
2. that the said micro-organisms belong to the genus Streptomyces;
3. that the antibiotics are accumulated in a medium in which the micro-organisms are cultured;
4. that so-accumulated antibiotics can be recovered in a desired purity from the culture broth by applying the physicochemical properties of the antibiotics; and
5. that the antibiotics have a strong antimicrobial activity against some common bacteria and acid-fast bacteria.

In the method of the present invention, those micro-organisms belonging to the genus *Streptomyces* and capable of producing the antibiotic B-2847 are employed. These microorganisms comprise, for example, *Streptomyces tolypophorus* nov. sp. which has been isolated from a soil sample in Tokyo, Japan, and mutants thereof.

The morphological and cultural characteristics of *Streptomyces tolypophorus* nov. sp. are as follows:

In the following descriptions the color names designated "Rdg." are based on Ridgway's "Color Standard and Nomenclature:"

1. Morphological Characteristics: Sporophores: straight or wavy, no spirals, and no whorls. Aerial mycelium, sclerotium formed, four to 20 microns, growing on, for example, glucose yeast extract, malt extract agar, or glycerin asparagine agar. Spores: ellipsoidal, 0.8 to 1.1 microns by 1.5 to 2.3 microns with smooth surface.

2. Cultural characteristics:
   a. Czapek's agar:
      Growth: abundant, folded and raised, and shows cracked surface at the edge of the growth, Light Orange Yellow (Rdg. III, 17–d) to Deep Chrome (Rdg. III, 17–b).
      Aerial mycelium: good, white.
      Reverse: Buff Yellow (Rdg. IV. 19–d) to Light Orange Yellow (Rdg. III, 17–d).
      Soluble pigment: Pale Orange Yellow (Rdg. III, 17–f) to Ochraceous-Buff (Rdg. XV, 15'–b)
   b. Glucose-Czapek's agar:
      Growth: more deeply folded than on Czapek's agar medium, formation of aerial mycelium, soluble pigment, and color of reverse are the same as on Czapek's agar.
   c. Glycerine Czapek's agar:
      Growth: abundant, but less folded than on medium (a) or (b), almost the same in other characteristics as on medium (a) or (b).
   d. Glucose asparagine agar:
      Growth: good, Pale Orange Yellow, penetrating into agar.
      Aerial mycelium: Poor to moderate, thin, white.
      Reverse: Pale Orange Yellow.
      Soluble pigment: none.
   e. Nutrient broth:
      small colonies floating on the surface.
      Aerial mycelium: white to Pallid Mouse Gray (Rdg. LI. 15'''''–f).
      Soluble pigment: none.
   f. Nutrient agar:
      Growth: poor to moderate, colorless.
      Aerial mycelium: poor, thin, white to Pallid Mouse Gray.
      Soluble pigment: none.
      Reverse colorless to Pale Orange Yellow.
   g. Glucose nutrient broth:
      Growth: abundant, developing at first on the surface, later forming floccus.
      Aerial mycelium: poor, thin, white to Capucine Buff (Rdg. III, 13–f).
      Soluble pigment: Pale Yellow.
   h. Glucose-nutrient agar:
      Growth: abundant, folded, and raised, colorless to Mars Yellow (Rdg. III, 15–i).
      Aerial mycelium: moderate, and thin, white colored.
      Reverse Mars Yellow.
      Soluble pigment: yellowish brown.
   i. Glycerin-nutrient agar:
      Growth: abundant and folded, Sudan Brown (Rdg. III, 15–k).
      Aerial mycelium: poor, white at the edges of growth.
      Soluble pigment: yellowish brown.
      Soluble
   j. Starch agar:
      Growth: colorless, moderate.
      Aerial mycelium: thin, white.
      Soluble pigment: none.
      Reverse: colorless.
   k. Whole egg:
      Growth: moderate, wrinkled, Deep Chrome (Rdg. III, 17–b).
      Aerial mycelium:
      Soluble pigment: none.
   l. Yeast extract agar:
      Growth: abundant, folded.
      Aerial mycelium: thin, white at the edges of growth.
      Reverse Mars Yellow.
      Soluble pigment: Mars Yellow to orange yellow.
   m. Potato plug:
      Growth: poor, pale yellowish brown to pale brown.
      Aerial mycelium: thin and white.
      Soluble pigment: none.
   n. Carrot Plug:
      Growth: poor to moderate, no change in carrot color.
      Aerial mycelium: white.
   o. Litmus milk (37° C.):
      slow peptonization without coagulation.
      Soluble pigment: reddish brown.
   p. Gelatin (25° C.):
      rapid liquefaction, white aerial mycelium formed.
      Soluble pigment: yellowish brown.
   q. Löffler's serum (37° C.):
      Growth: thin, poor, orange yellow, weak liquefaction.
      Aerial mycelium; none.
   r. Cellulose:
      Growth: colorless, gradually turning orange yellow.
      Aerial mycelium: white cottony.
      Cellulose not decomposed.
   s. Calcium malate agar:
      Growth: moderate, Pale Orange Yellow penetrating into the agar.
      Aerial mycelium: thin and white.
      Reverse: Pale Orange Yellow to Ochraceous-Buff. (Rdg. XV 15'–b).
      Soluble pigment: none or Chamois (Rdg. XXX, 19''–b)
   t. Tyrosine Agar:
      Growth: moderate, colorless to yellow.
      Aerial mycelium poor, white.
      Reverse: colorless.
      Soluble pigment: none.
   u. Peptone agar:
      Growth: poor to moderate.
      Aerial mycelium: poor, thin, white.
      Reverse: colorless.
      Soluble pigments: none.

3. Physiological characteristics:
   a. Optimum pH:
      some growth at a pH between 4.0 and 10.0,
      optimum growth at a pH between 6.0 and 8.0.
   b. Optimum temperature:
      Growth was observed in temperature range between about 20° C. and about 43° C., and the optimum temperature is 28° C., aerobic.
   c. Starch hydrolysis: none.
   d. Nitrate reduction; positive.
   e. Chromogenicity: none.

This micro-organism grown on some synthetic media shows a Buff Yellow to Light Orange Yellow growth, and produces soluble pigments of Pale Orange Yellow to Yellowish Brown and its aerial mycelium in White.

On some proteinaceous media, the micro-organism produces soluble pigments of yellowish brown color but is not one of chromogenic type.

This organism shows no hydrolysis of starch and no liquefaction of gelatin, and reduces nitrate to nitrite.

Utilization of carbon sources, observed by Pridham and Gottlieb method, is shown in table 1.

Table 1

| | | | |
|---|---|---|---|
| Erythritol | − | D-Galactose | +++ |
| Adonitol | − | D-Glucose | + to ++ |
| D-Sorbitol | − | D-Fructose | ++ |
| i-Inositol | +++ | Rhamnose | +++ |
| D-Manitol | + to ++ | Melibiose | ++ |
| Dulcitol | + to ++ | Maltose | ++ |
| D-Xylose | ++ to +++ | Sucrose | +++ |
| L-Arabinose | ++ | Lactose | + to ++ |
| L-Sorbose | + | Raffinose | + to ++ |
| Trehalose | +++ | Sodium succinate | + to ++ |
| Salicin | + to ++ | D-Mannose | ++ |
| Esculin | − to ± | Starch | + to ++ |
| Inulin | ++ | Glycerin | ++ |
| | | Control | − |
| Sodium acetate | + to ++ | | |
| Sodium citrate | + to ++ | | |

Remarks: +++ heavy growth, ++ good growth, + fair growth, ± faint growth, − no growth From the comparison of the above-mentioned mycological properties with the descriptions in "Actinomycetes", 2, 152 et seq., (S. A. Waksman, 1961) and "Applied Microbiology"6, 52 (T. G. Pridham 1958), *Streptomyces tolypophorus* appears to be close to such species as *Streptomyces globisporus*, *Streptomyces autotrophicus*, *Streptomyces orientalis*, *Streptomyces kimberi* and *Streptomyces aburaviensis*, all of which are characterized by straight or wavy sporophores and white aerial mycelium.

*Streptomyces tolypophorus* is, however, distinguished from *Streptomyces globisporus* in that the former shows an orange yellow growth on synthetic agar, produces white aerial mycelia on potato plugs, and grows on cellulose, while the latter shows a colorless growth on synthetic agar, forms greenish yellow aerial mycelia on potato plugs, and cannot grow on cellulose.

*Streptomyces tolypophorus* also differs from *Streptomyces autotrophicus* in the fact that the former grows moderately on starch agar, liquifies gelatin rapidly, and reduces nitrate to nitrite, whereas the latter presents a poor growth on starch agar, no liquefaction of gelatin and is negative in nitrate reduction.

*Streptomyces tolypophorus* appears to have close resemblance with *Streptomyces orientalis* in growing on cellulose, though the latter presents less growth on Czapek's agar, and does not produce soluble pigments in gelatin

*Streptomyces tolypophorus* forms ellipsoidal spores, produces yellowish brown soluble pigments in gelatin, and does not coagulate milk, while *Streptomyces kimberi* forms small spherical spores, does not produce soluble pigments in gelatin and coagulates milk.

Moreover, *Streptomyces tolypophorus* differs from *Streptomyces aburaviensis* in the formation of soluble pigments in glucose-asparagine agar, or in calcium malate agar, and in the utilization of carbon sources.

In view of the report presented by L. Ettlinger et al. ('- 'Archiv. fur Mikrobiologie" 31, 326 (1958) *Streptomyces tolypophorus* belongs to the series "(B) Sporen glatt-II. Luftmycel niveus." Among those micro-organisms belonging to this series, however, *Streptomyces tolypophorus* is clearly distinguished from *Streptomyces rubrireticuli* and *Streptomyces niveoruber* in that the latter group produce whorl or spiral sporophores; *Streptomyces tolypophorus* is differentiated from *Streptomyces fulvissimus* in that the latter produces a golden to orange soluble pigment on Czapek's agar or on glucose asparagine agar, and gives a deep red brown growth on nutrient agar. *Streptomyces tolypophorus* also differs from *Streptomyces phaeochromogenes* in that the latter belongs to the chromogenic type.

Regarding the formation of sclerotic granules, *Chainia* (M. J. Thirumalachar: Nature 176 934 (1955) and *Streptomyces griseus* (M. L. Gattani: Nature 180 1293 (1957), etc., have been reported to form "sclerotic granules" from a substrate mycelium, while in case of *Streptomyces tolypophorus* the sclerotic granule develops not from a substrate mycelium but from an aerial mycelium. In this regard *Streptomyces tolypophorus* has a close resemblance with *Streptomyces aerocolonigenes* reported by R. Shinobu et al. (The Botanical Magazine 73, 212 (1960), but differs from the latter in that the latter develops only poor aerial mycelium, and produces a brown soluble pigment on glucerin-Czapek's agar, offers a light brown soluble pigment, shows apricot yellow growth on starch agar, and is positive in tyrosinase reaction and diastase reaction, negative in raffinose utilization, and ambiguous in rhamnose utilization.

From the foregoing, *Streptomyces tolypophorus* is to be classified as constituting a new species, and a culture thereof has been deposited at American-Type Culture Collection, Rockville, MD., U.S.A. under the accession number of ATCC-21177.

The microbial characteristics of Actinomycetes, especially those of the genus *Streptomyces*, , are not generally fixed and this applies also to the characteristics of the *Streptomyces tolypophorus*. Otherwise stated, there are many mutants and variants of *Streptomyces tolyphorus* nov. sp.

Among the mutants and variants of *Streptomyces tolypophorus*, regardless of whether the variation is caused naturally or artificially, for example, with X-ray, ultraviolet ray, or by the action of chemical reagents, any one can be employed in the method of the present invention, as long as it produces B-22847.

The object of this invention is realized by incubating a B-2847-producing organism belonging to the genus *Streptomyces* in a medium containing assimilable carbon sources, digestible nitrogen sources and other necessary nutrients, and recovering antibiotic B-2847 therefrom.

As the carbon sources, for example, glucose, inositol, xylose, galactose, fructose, sucrose may be employed. As the nitrogen sources, for example, peptone, soybean flour, corn steep liquor, meat extract, rice bran, wheat bran, urea, ammonium salts, organic or inorganic nitrogen compounds may be employed. Further, a small quantity of inorganic salts such as sodium chloride, phosphates, salts of metals such as calcium, zinc, manganese, iron may be added to the medium, and, if necessary, conventional nutrient factors or antifoaming agents such as animal oil, vegetable oil or mineral oil may also be added.

As the culture medium, this can be liquid or solid, but submerged culture is most advantageous.

The culture conditions such as temperature, culture period and pH of the medium are determined so that the production of B-2847 is maximum.

When *Streptomyces tolypophorus* is employed, maximum production of B-2847 is attained in about 2 to 7 days (shake culture).

The pH of the culture is advantageously maintained around neutral, i.e. about 5 to 9 and the cultural temperature is between about 20 ° C. and about 45+ C., more desirably between about 25° C. and about 35° C.

Antibiotic B-2847 thus-accumulated in the culture broth is recovered therefrom by applying per se conventional methods but taking into adequate consideration the physiochemical properties of B-2847, such as differences between B-2847 and impurities in solubility, in adsorbancy in ionic bonding, in the partition ratios between the two liquid phases, salting out, etc., solely or in combination. More concretely stated, the antibiotic B-2847, being fat-soluble and mainly accumulated in the culture liquid, is advantageously recovered from the filtrate, and then purified.

Some antimicrobial activities are observed in the mycelia, so that extract of the culture broth with organic solvent such as acetone, ethanol, etc. also advantageously applies to further purification of the antibiotic as mentioned in connection with the culture filtrate. For the recovery of antibiotic B-2847, the culture filtrate is adjusted to pH 2 to 8, and extracted with organic solvents.

As the organic solvents employed for extraction from the culture filtrate, these are exemplified by acetates such as ethyl acetate, butyl acetate; ethers such as diethyl ether; ketones such as methylisobutyl ketone; alcohols such as n-butanol, n-amylalcohol; aromatic compounds such as benzene, toluene; halogenated hydrocarbons such as chloroform, dichloromethane.

Thus-obtained objective substance-containing solvent mixed with an aqueous solution or buffer solution adjusted at about pH 8 to transfer impurities to the water phase, followed by washing with water, drying, and concentration under reduced pressure; and admixture with a nonpolar organic solvent such as petroleum ether, petroleum benzine, n-hexane or cyclohexane to give crude precipitates of B-2847, or the objective compound is directly recovered from the concentrate by the use of a suitable adsorbent. The crude substance can be subjected to further purification by fractional precipitation with a suitable organic solvent. For example, the crude substance is mixed with diethyl ether to transfer the desired fraction to the organic solvent, or admixed with a mixture of ethyl acetate and n-hexane to give precipitates of B-2847, from which pure substance is easily obtained.

In case of employing adsorbent for the purification, the objective substances are first adsorbed on the adsorbent, followed by elution with proper solvents.

As adsorbents, silica gel, oxalic acid-impregnated silica gel, activated carbon, etc., can be employed.

Solvents vary with kinds of adsorbents. For example, in case of silica gel chromatography, the adsorbed B-2847 is at first treated with low polar solvents such as benzene, diethyl ether, ethyl acetate, etc., to remove impurities, then eluted with high polar solvents such as ethyl acetate, acetone, ethanol, n-butanol, water, acetic acid, a buffer solution, etc., solely or in combination.

When activated carbon is employed as an adsorbent, ethyl acetate, ethyl acetate mixed with a small amount of chloroform and acetone are used as elution solvents after treatment with n-hexane, benzene, diethyl ether, etc.

Throughout the aforementioned process, the procedures for the recovery of B-2847R are carried out preferably in the presence of a necessary amount of l-ascorbic acid.

The physico-chemical and biological properties of B-2847 thus purified are as follows:

1. solubility
   B-2847Y: easily soluble in methanol, ethanol, n-butanol, acetone, chloroform, ethyl acetate or benzene; insoluble or slightly soluble in water, petroleum ether or n-hexane.
   B-2847R: easily soluble in methanol, ethanol, acetone, chloroform, ethyl acetate; soluble in benzene, diethyl ether; slightly soluble in M/15 phosphate buffer at pH 2 to 10, water; insoluble in n-hexane, petroleum ether.

2. Color reaction
   B-2847Y: positive to Tollens reagent and magnesium acetate reagent; negative to Barton's reagent ($FeCl_3$ plus $K_3Fe(CN)_6$), Molisch reaction, and Ehrlich reagent.
   B-2847R: positive to Tollens reagent, ferric chloride, Barton's reagent, negative to ninhydrin reaction, Molisch reaction, Sakaguchi's reaction, Ehrlich reagent.

3. Rf values
The Rf values obtained by paper partition chromatography, using ascending method on "Whatman filter paper No. I" and observed as color spots and as inhibition zone on bioautogram employing *Staphylococcus aureus* as a test organism are as follows:

| Solvents | Rf value | |
|---|---|---|
| | B–2847Y | B–2847R |
| n-hexane, benzene, ethanol water (1:3:1:3) | 0.78 | |
| n-hexane, benzene, acetone, water (30;10;18:22) | 0.6 | 0.65 |
| n-hexane, diethyl ether, acetone water (15:5:8:12) | 0.27 | | the Rf values obtained by thin layer chromatography are as follows:

| Solvents | Rh value | |
|---|---|---|
| | B–2847Y | B–2847R |
| 1% oxalic acid-containing ethyl acetate, acetone (1:1) | 0.05 | 0.7 |
| 1% oxalic acid-containing ethyl acetate | 0.00 | 0.2 |
| 1% oxalic acid-containing acetone | 0.2 | |

4. Elementary analysis (percent)
B–2847Y: prisms recrystallized from ethyl acetate-n-hexane

| C | H | N |
|---|---|---|
| 60.71±1.0 | 6.59±0.5 | 3.10±0.5 |

B–2847R: prisms recrystallized from benzene

| | | |
|---|---|---|
| 64.66±1.0 | 6.67±0.5 | 3.03±0.5 |

5. Molecular weight: (measured by V.P.O. method using ethyl acetate as a solvent)
B-2847Y and B-2847R: about 600 to about 1,000

6. Specific rotation B–2847Y: $[\alpha]_D^{22} = +325°±30°$ (c=1.0 EtOH  +376°±40° (c=0.5 $Me_2CO$)

Figure 2:
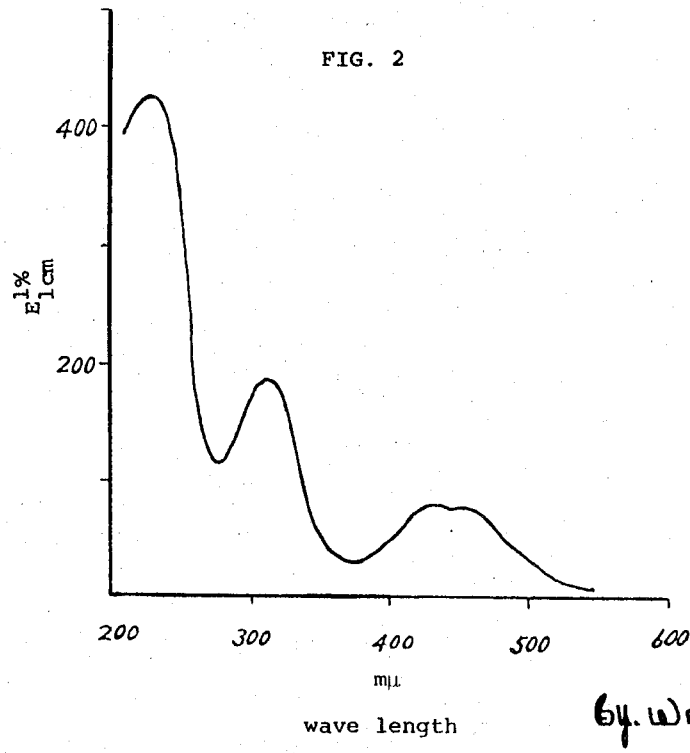

7. Absorption spectrum
The ultraviolet and visible absorption spectra in ethanol solution are shown in FIG. 1 and FIG. 2, respectively.
The significant adsorption maxima observed are as follows:

| | B-2847Y | | B-2847R | |
|---|---|---|---|---|
| EtOH: | λ max | $E_{1cm}^{1\%}$ | λ max | $E_{1cm}^{1\%}$ |
| | 232±2 mμ | 332±30 | 232±2 mμ | 426±40 |
| | 290±2 mμ | 269±30 | 310±2 mμ | 184±20 |
| | 337±2 mμ | 154±15 | 420 to 460 mμ | ca. 80 |
| | 370 to 430 mμ (shoulder) | | | |
| B-2847Y phosphate buffer (pH 7.2): | | | | |
| | λ max | $E_{1cm}^{1\%}$ | | |
| | 234±2 mμ | 356±35 | | |
| | 318±2 mμ | 298±30 | | |
| | 384±2 mμ | 65±6 | | |
| | 465±2 mμ | 56±5 | | |

Figure 3:
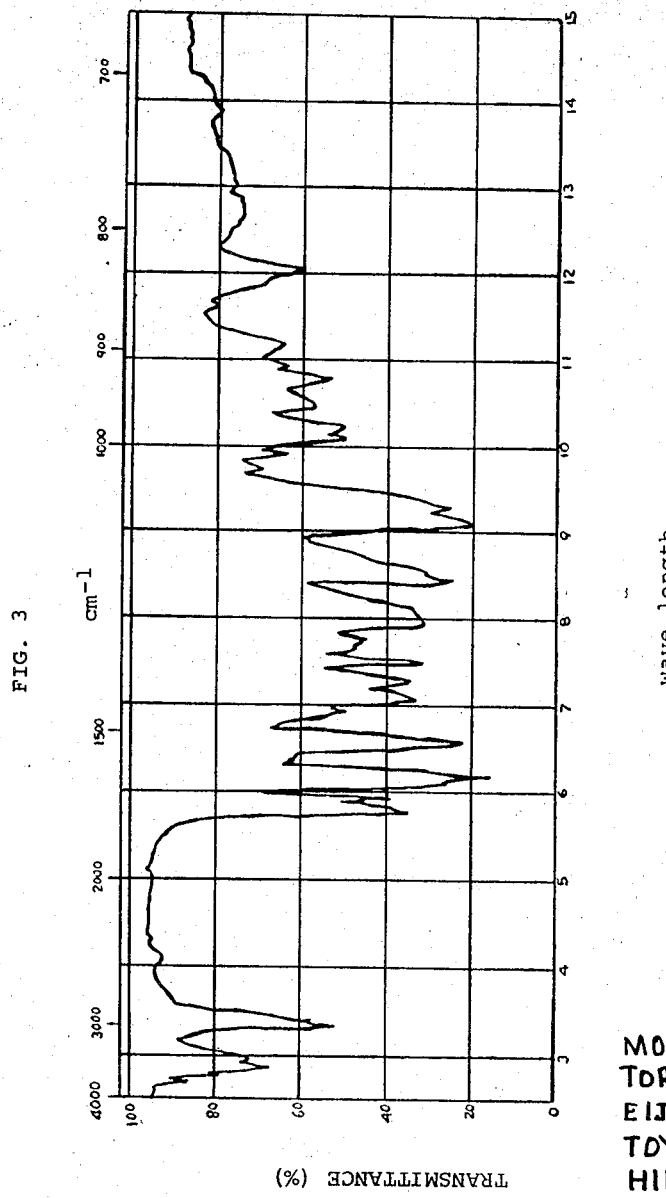
Figure 4:
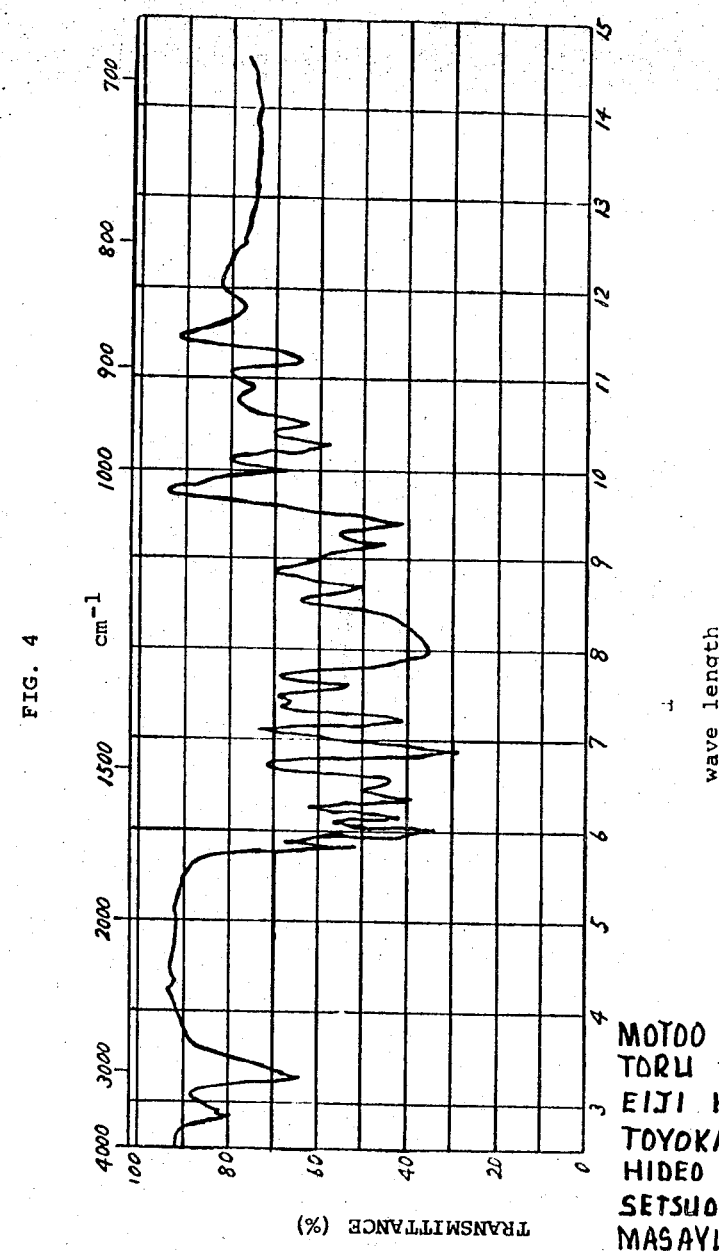

Infrared spectra of B-2847 are measured in chloroform solution and shown in FIGS. 3 and 4, respectively, and the significant absorptions in wave number are as follows:
B–2847Y:
3490(M), 3350(W), 2940(M), 2940(M), 2880(M), 1725(S), 1708(S), 1680(S), 1630(VS), 1605(VS), 1510(VS), 1440(M), 1410(S), 1365(S), 1330(S), 1300(M), 1287(M), 1255(S), 1235(S), 1175(VS), 1160(S), 1140(Sh), 1093(VS), 1072(VS), 1020(W), 1002(M), 985(M), 970(M), 945(M), 920(M), 908(M), 887(M), 823(M) $cm^{-1}(CHCl_3)$ B-2847R:
3500(M), 3400(W), 3040(M), 2950(M), 2910(Sh), 1715(S), 1685(Sh), 1665(VS), 1645(S), 1626(S), 1610(Sh), 1565(VS), 1525(VS), 1454(VS), 1385(VS), 1345(M), 1315(S), 1250(VS), 1155(S), 1093(S), 1067(VS), 1002(M), 973(S), 951(M), 915(M), 890(M), cm$^{-1}$(CHCl$_3$).

*VS: very strong, S: strong, M: medium, Sh: shoulder.

The biological properties of the antibiotic B-2847 are as follows:

1. Antibacterial spectra:

Antimicrobial activities of B-2847 against various micro-organisms are shown in table 2.

The test is carried out at 37° C. on bouillon agar for 20 hours against common bacteria, at 37° C. on glycerin bouillon agar for 48 hours against acid-fast bacteria, and at 28° C. on glucose bouillon agar (pH 7.0) for 48 hours against yeasts and fungi.

TABLE 2

| Micro-organisms | Minimum Inhibitory Concentration μg./ml. | |
| --- | --- | --- |
| | B-2847Y | B-2847R |
| Escherichia coli | 50 | 50 |
| Proteus vulgaris | 10 | 10 |
| Pseudomonas aeruginosa | | 20 |
| Staphylococcus aureus Terajima | 0.005 | |
| Staphylococcus aureus Heatley | 0.005 | |
| Staphylococcus aureus ATCC 4012 | 0.005 | |
| Staphylococcus aureus 209 P | 0.001 | 0.001 to 0.0005 |
| Staphylococcus aureus 209 P (streptomycin resistant) | 0.0001 | |
| Staphylococcus aureus 209 P (chlorotetracycline resistant) | 0.001 | |
| Staphylococcus aureus 209 (chloramphenicol resistant) | 0.0001 | |
| Staphylococcus aureus 209 P (Oleandomycin-Erythromycin resistant) | 0.001 | |
| Bacillus cereus | | 0.5 to 0.2 |
| Bacillus subtilis PCI 219 | 0.1 | 0.2 to 0.1 |
| Bacillus subtilis ATCC 6633 | 0.1 | 0.2 to 0.1 |
| Bacillus brevis | 0.005 | |
| Sarcina variabilis | 0.001 | |
| Mycobacterium avium | >50 | >50 |
| Mycobacterium avium (streptomycin resistant) | >50 | >50 |
| Mycobacterium smegmatis | 10 to 20 | 10 to 20 |
| Mycobacterium phlei | 50 | 50 |
| Mycobacterium sp. ATCC 607 | >50 | >50 |
| Candida albicans | >50 | >50 |
| Penicillium chrysogenum | >50 | >50 |
| Saccharomyces cerevisia | >50 | >50 |
| Piricularia oryzae | >50 | >50 |
| Aspergillus niger | >50 | >50 |

Antibiotic B-2847 has a strong inhibitory action against Gram-positive bacteria.

Lethal Dose after 4 days against mice is as follows:

B-2847Y was injected as a solution in carboxymethyl cellulose, and B-2847R was injected as an aqueous polyoxyethylene solution in hydrogenated castor oil.

| | LD$_{50}$ | |
| --- | --- | --- |
| | B-2847Y | B-2947R |
| Intraperitoneal | 330 mg./kg. | 390 mg./kg. |
| Subcutaneous | 2,200 mg./kg. | 500 mg./kg. |
| Intravenous | | 330 mg./kg. |

Staphylococci are pyogenic or pus-forming bacteria. They tend to produce circumscribed lesions, e.g. in the form of abscesses and the like, which often occur in the skin. Staphylococci are the cause of furuncles and of carbuncles and other common wound infections. The new products of the present invention are useful in topical preparations for the treatment of this type of infection in mammals (dogs, cats, humans, etc.). Thus, a useful preparation for topical application to an infection due to Staphylococcus aureus is as follows:

Into 1 g. of wool fat is uniformly incorporated 8 mg. of antibiotic B 2847 Y or R and the mixture is then admixed uniformly with sufficient white petrolatum to make 10 g. of ointment.

This is topically applied in amount sufficient to cover the wound being treated, with gently rubbing in, the application being made at least once daily and being repeated several times daily, if necessary or desired.

Due to the disclosed bactericidal and bacteriostatic properties of the new products of the invention, they are useful e.g. to disinfect hospital apparatus, etc. which are generally exposed to pathogenic Gram-positive bacteria of the type which are sensitive to such products, as aforementioned. Disinfection is effected by application or spraying of a solution (e.g. methanolic or ethanolic, etc.) containing about 20 to about 200 mcg. of antibiotic B-2847Y or B-2847R per ml.

In the present specification and in the following examples, the abbreviations ml., l., ° C., mm., mcg., mg., g., kg., r.p.m., hr(s), dil., M.P., mμ are milliliter, liter, degree, millimeter, microgram, milligram, gram, kilogram, rotation per minute, hour(s), dilute, melting point, and millimicron, respectively, and unless other wise noted percentages are on the weight by volume basis regarding compositions of media, and on the volume by volume basis in connection with liquid mixtures.

The following examples are merely for illustrative purposes and are not to be construed as limitation of the present invention.

EXAMPLE 1

200-ml. flasks each containing 20 ml. of a sterilized culture medium comprising 3 percent of glucose, 0.2 percent of peptone, 1 percent of glycerin, 1.5 percent of soy bean meal, 0.05 percent of CuCl$_2$, 0.1 percent of MgSo$_4$.7H$_2$O, 0.01 percent of FeSo$_4$, 0.1 percent of MnSO$_4$, 0.3 percent of CaCo$_3$ were inoculated with a culture of Streptomyces tolypophorus ATCC-21177 cultivated at 28° C. on Bennett's agar for about 6 to 8 days. The culture in each flask was shaken at 28° C. for 72 hours, and at 220 r.p.m. on a rotary shaker. The culture broth was combined and centrifuged to obtain 12 l. of supernatant, which was washed with one third of its volume of n-hexane. The water phase was adjusted by dil. H$_2$SO$_4$ at pH 3.0, and extracted twice with one third and one fifth of its volume of ethyl acetate, the ethyl acetate layers were combined and washed twice with one third of its volume of Sørensen's M/15 phosphate buffer solution (pH 8.0).

The resultant ethyl acetate solution was washed twice with one sixth of its volume of water, dried with anhydrous sodium sulfate, and concentrated under reduced pressure.

The concentrate was subjected to thin layer chromatography on 2 percent oxalic acid-impregnated silica gel plate with 1 percent oxalic acid-containing acetone as solvent.

About Rf 0.2 fractions on the chromatogram were collected and mixed with ethyl acetate and water. After shaking, the ethyl acetate phase was separated, washed repeatedly with water, dried with anhydrous sodium sulfate, concentrated under reduced pressure, and mixed with n-hexane or petroleum ether to give 45 mg. of crude B-2847Y crystals which were recrystallized from n-hexane ethyl acetate mixture (3:1) to give 25 mg. of B-2847Y, melting at 120° to 125° C. (decomposition), and showing antimicrobial activity.

Minimum inhibitory concentration:
0.001 mcg./ml.
(test organism: Staphylococcus aureus 209P)

8.5 l. of ethyl acetate solution obtained by the aforementioned method was concentrated, and mixed with 1.0 ml. of ethyl acetate and 10 ml. of n-hexane to give 570mg. of the crude B-2847Y, 300 mg. of which was extracted with 9 ml. of diethyl ether and, after filtration, the clear filtrate was again extracted with 9 ml. of diethyl ether. The extract was concentrated under reduced pressure. Thus obtained concentrate was dissolved in 1 percent oxalic acid-containing ethyl acetate, chromatographed on 12 g. of silica gel column and washed with 600 ml. of 1 percent oxalic acid-containing ethyl acetate. The adsorbed part of B-2847Y was collected, extracted with an ethyl acetate-saline solution, the ethyl acetate phase was sufficiently washed with water, dried, concentrated, and chromatographed on the same adsorbent as mentioned above to give 11 mg. of B-2847 crystals. The melting point and antimicrobial activity of the product are the same as stated before.

EXAMPLE 2

A 50-liter tank containing 30 l. of culture medium comprising 3 percent of glucose, 1 percent of glycerin, 0.2 percent of peptone, 1.5 percent of soy bean meal, 0.05 percent of $MgSO_4 \cdot 7H_2O$, 0.1 percent of $FeSO_4$, 0.01 percent of $ZnSO_4$, 0.01 percent of $MnSO_4$, 0.3 percent of $CaCO_3$, (pH 7)

was inoculated with a culture broth obtained under the same conditions as in example 1 at a rate of about 1.5 to 2.0 percent by volume to the culture medium, and incubated at 28° C. for 42 hours, with an aeration of 30 l. per minute, stirring 240 r.p.m. The culture broth was filtered with a filter aid (Hyflo Supercel) to yield 21 l. of filtrate, which was extracted as in example 1, the ethyl acetate solution was concentrated under reduced pressure and the concentrate was dissolved in ethyl acetate, treated with n-hexane in an amount ten times as much as the total volume to give 1.5 g. of crude B-2847Y powder.

Five hundred mg. of crude powder thus obtained was dissolved in 10 ml. of benzene-ethyl acetate (1:1) and chromatographed on 25 g. of silica gel column. The silica gel was successively washed with benzene, benzene-ethyl acetate (1:1), (1:2), (1:3), ethyl acetate, and ethyl acetate-acetone (1:1). The antimicrobially active fractions were collected, concentrated, dissolved in ethyl acetate, and chromatographed on 7.5 g. of activated carbon column. The column was then successively eluted with ethyl acetate-chloroform (95:5) and 90:10), the active fractions were collected and concentrated. The concentrate was then dissolved in n-hexane, and kept in an ice chest to yield 71 mg. of B-2847Y crystals, which were recrystallized from n-hexane-ethyl acetate solution to yield 40 mg. of B-2847Y, melting at 120° to 125° C. (decomposition) and showing antimicrobial activity;

Minimum inhibitory concentration:

0.001 mcg/ml.
(Test organism: Staphylococcus aureus 209P)
1.5 g. of the crude powder was separated by means of thin layer chromatography on silica gel and chromatographed on activated carbon to give 102 mg. of crude B-2847Y.

700 mg. of crude powder thus obtained was chromatographed successively on 14 g. of activated carbon column, and twice on silica gel thin layer chromatography to give 33 mg. of crude B-2847Y. Alternatively 5 g of crude powder was extracted twice with 200 ml. and 150 ml. of diethyl ether. The extract was concentrated under reduced pressure, and chromatographed on 100 g. of activated carbon column, the obtained active fraction was concentrated and the concentrate was chromatographed on silica gel column after the manner described on page 23, lines 4 to 12 in example 1 to yield 320 mg. of B-2847Y.

EXAMPLE 3

A 2-liter flask containing 500 ml. of a medium, sterilized at 121° C. for 15 minutes, comprising 1 percent of glucose, 1 percent of glycerin, 0.5 percent of peptone, 1 percent of corn steep liquor, 1 percent of soy bean meal, 0.5 percent of precipitated $CaCO_3$ (pH 7.0)

was inoculated with *Streptomyces tolypophorus* ATCC-21177, and incubated at 28° C. for 48 hours, on a rotary shaker.

A 200-liter tank containing 100 l. of a sterilized culture medium comprising 3 percent of glucose, 1 percent of glycerin, 0.2 percent of peptone, 1.5 percent of soy bean meal, 0.05 percent of $CaCl_2$, 0.1 percent of $MgSO_4 \cdot 7H_2O$, 0.01 percent of $FeSO_4$, 0.01 percent of $ZnSO_4$, 0.3 percent of $CaCO_3$ was inoculated with 3 l. of a culture broth obtained in 2-liter flask and incubated under 100 l. of aeration per minute with stirring at 200 r.p.m. for 42 hours.

Thus-obtained culture broth was filtered, 85 l. of the filtrate was extracted with ethyl acetate as in example 1 to give 7.5 g. of crude powder, which was twice extracted, each time with diethyl ether in an amount 30 times as much as the volume of the powder, the extract was concentrated, dissolved in 75 ml. of ethyl acetate, and 53 ml. of n-hexane was added to give 2.9 g. of powder.

Alternatively 10 g. of the powder was dissolved in 50 ml. of ethyl acetate-diethyl ether (1:1) and chromatographed on 100 g. of activated carbon, the activated carbon column was then successively eluted with diethyl ether, ethyl acetate and chloroform. B-2847Y, which had been eluted mainly with the ethyl acetate fraction, was concentrated under reduced pressure, the concentrate was placed on 40 g. of silica gel with 1 percent oxalic acid-containing ethyl acetate as solvent.

The B-2847Y fractions were collected, extracted with ethyl acetate, and saline solution, the extract was thoroughly washed with water, dried, and concentrated. The concentrate was crystallized from ethyl acetate or ethyl acetate and n-hexane mixture to give crude B-2847Y crystals.

The crude crystals were recrystallized from ethyl acetate to give 1.2 g. of yellow crystals, decomposing at 120° to 125° C. The minimum inhibitory concentration of the crystals against *Staphylococcus aureus* 209 P was 0.001 mcg. per ml.

As some amount of B-2847Y was contained in the chloroform-eluted fraction in the case of activated carbon, the fraction was again purified on activated carbon and on silica gel to give 340 mg. of B-2847Y crystals.

EXAMPLE 4

1.8 kg. of wet mycelium was collected by filtration or centrifuging from 20 l. of the culture broth obtained in example 3.

The wet mycelia were mixed with 4 liters of acetone-water (3:1), and filtered to give 3.4 l. of clear filtrate, which was concentrated under reduced pressure at a temperature not higher than 40° C. The concentrate was adjusted at pH 3.5 by dil. $H_2SO_4$, and extracted twice with 0.8 l., each time, of ethyl acetate, the extract was dried, concentrated under reduced pressure, and mixed with n-hexane or diethyl ether-petroleum ether (1:10) to give 250 mg. of crude powder (purity: about 5 percent on weight basis).

EXAMPLE 5

Two-liter flasks each containing 500 ml. of a sterilized medium comprising 2 percent of glucose, 3 percent of soluble starch, 1 percent of soy bean meal, 1 percent of corn steep liquor, 1 percent of peptone, 3 percent of NaCl, 0.5 percent of $CaCO_3$ (pH 7.0) were inoculated with *Streptomyces tolypophorus* ATCC-21177 and incubated at 28° C. for 24 hours on a reciprocating shaker. 3 liters of the combined culture broth thus obtained was transferred to a 200-liter tank containing 100 l. of a sterilized medium comprising the same components as in the flasks, and the tank was incubated for 24 hours.

The whole culture in the 200-liter tank was transferred to a 2,000-liter tank containing 1,000 l. of a sterilized medium comprising 3 percent of glucose, 0.2 percent of peptone, 1.5 percent of soy bean meal, 0.3 percent of calcium carbonate (pH 7.0), silicone oil (antifoam agent), and the tank was incubated at 28° C. under aeration of 1,000 l. per minute and stirring 140 r.p.m. for 42 hours.

Eight hundred forty l. of the filtrate was adjusted to pH 8.0 to 3.0, and extracted with one third of its volume of ethyl acetate. The ethyl acetate fraction was washed twice, each time with one half of its volume of 0.1 percent ascorbic acid-containing aqueous solution, dried and concentrated in vacuo under nitrogen atmosphere.

The concentrate was mixed with 2 l. of diethyl ether-petroleum ether (1:10) solution to give about 70 g. (purity 10 percent) of crude B-2847R powder.

Five g. of this crude powder was dissolved in 250 ml. of chloroform and the insoluble material was removed. The chloroform solution was passed through 500 g. of silica gel column, which had been prepared by suspending it in 1.1 l. of acetone containing 1 percent of oxalic acid and 0.2 percent of l-ascorbic acid, and removing acetone under reduced pressure, and dried at room temperature. The column was then successively eluted with 2 l. of diethyl ether, 2 l. of diethyl ether and 1 percent oxalic acid-containing ethyl acetate (9:1), 2 l. of diethyl ether and 1 percent oxalic acid-containing acetate (4:1), 1 l. of diethyl ether and 1 percent oxalic acid-containing ethyl acetate (1:1), 2 l. of 1 percent oxalic acid-containing ethyl acetate.

B-2847R was contained in the mixture of diethyl ether and ethyl acetate, and in ethyl acetate.

The combined eluate was washed seven to eight times with an aqueous solution containing 0.1 percent of l-ascorbic acid, and with distilled water, dried and concentrated in vacuo under nitrogen atmosphere to obtain about 400 mg. of B-2847R (purity 80 percent by weight basis).

EXAMPLE 6

Eight hundred mg. of B-2847R obtained in the same manner as described in example 5 was dissolved in 60 ml. of acetone, mixed with about 40 ml. of 1 to 2 percent l-ascorbic acid-containing aqueous solution, and 60 ml. of water and then extracted with 100 ml. of benzene (or 150 ml. of diethyl ether not containing peroxide), the extract was washed twice with water, dried with anhydrous sodium sulfate, concentrated in vacuo under nitrogen atmosphere, and then mixed with n-hexane to obtain about 350 mg. of reddish orange powder of B-2847R which was crystallized from benzene to give reddish orange crystals. The crystals were washed with a small amount of chilled benzene and n-hexane, and desiccated under cooling to obtain about 200 mg. of B-2847R (purity; more than 90percent).

What we claim is:
1. Antibiotic B-2847Y, which has the following characteristics:
    1. its elementary analysis is C 60.71±1.0 percent, H. 6.59±0.5 percent, N 3.10±0.5 percent (recrystallized from ethyl acetate and n-hexane),
    2. its ultraviolet absorption spectrum is as shown in FIG. 1 of the accompanying drawings; the maxima in EtOH being:
        232±2 mμ 290±2 mμ and 337±2 mμ, with a shoulder at 370 to 430 mμ,
    3. its infrared absorption spectrum is as shown in FIG. 3 of the accompanying drawings, with the following significant absorptions in wave number:
        3490(M), 3350(W), 3000(M), 2940(M), 2880(M), 1725(S), 1708(S), 1680(S), 1630(VS), 1605(VS), 1510(VS), 1440(M), 1410(S), 1365(S), 1330(S), 1300(M), 1287(M), 1255(S), 1235(S), 1175(VS), 1160(S), 1140(Sh), 1093(VS), 1072(VS), 1020(W), 1022(M), 985(M), 970(M), 945(M), 920(M), 109(M), 887(M), 823(M) cm$^{-1}$ (in CHCl$_3$).
    4. its color reaction is positive to Tollens reagent and to magnesium acetate reagent.
    5. it is soluble in methanol, ethanol n-butanol, acetone, chloroform, ethyl acetate; insoluble or slightly soluble in water, petroleum ether and n-hexane and
    6. it has a molecular weight of about 600 to about 1,000.
2. Antibiotic B-2847R, which has the following characteristics:
    1. its elementary analysis is C 64.66±1.0 percent, H 6.67±0.5 percent, N 3.03±0.5 percent (recrystallized from benzene),
    2. its ultraviolet absorption spectrum is as shown in FIG. 2 of the accompanying drawings, the λ maxima in EtOH being:
        323±2 mμ, 310±2 mμ and 420 to 460 mμ,
    3. its infrared absorption spectrum is as shown in FIG. 4 of the accompanying drawings, with the following significant absorptions in wave number:
        3500(M), 3400(W), 3040(M), 3950(M), 2910(Sh), 1715(S), 1685(Sh), 1655(VS), 1645(S), 1626(S), 1610(Sh), 1565(VS), 1525(VS), 1455(VS), 1385(VS), 1345(M), 1315(S), 1250(VS), 1155(S), 1093(S), 1067(VS), 1022(M), 973(S), 951(M), 915(M), 890(M) cm$^{-1}$ (in CHCl$_3$),
    4. its color reaction is positive to Tollens reagent, to ferric chloride reagent, and to Barton's reagent,
    5. it is soluble in methanol, ethanol, acetone, chloroform, ethyl acetate, benzene, diethyl ether; insoluble or slightly soluble in n-hexane, petroleum ether and water and
    6. it has a molecular weight of about 600 to about 1,000.
3. A method for producing antibiotics B-2847R and B-2847R, which comprises culturing *Streptomyces tolypophorus* ATCC-21177 in a nutrient medium containing assimilable carbon sources and digestible nitrogen sources at a temperature of about 20° C. to about 45° C. under aerobic conditions until a mixture of B-2847Y and B-2847R is substantially accumulated in the culture broth, and isolating either one of the accumulated antibiotics therefrom.

* * * * *